(12) United States Patent
Maeno et al.

(10) Patent No.: US 7,389,976 B2
(45) Date of Patent: Jun. 24, 2008

(54) VIBRATION DAMPING DEVICE

(75) Inventors: Hajime Maeno, Kasugai (JP); Atsushi Muramatsu, Komaki (JP); Jyoji Tsutsumida, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 204 days.

(21) Appl. No.: 11/274,510

(22) Filed: Nov. 16, 2005

(65) Prior Publication Data
US 2006/0108726 A1    May 25, 2006

(30) Foreign Application Priority Data
Nov. 24, 2004   (JP)   ............... 2004-338294

(51) Int. Cl.
*F16F 5/00*   (2006.01)
*F16F 9/00*   (2006.01)
*F16F 13/00*  (2006.01)
*F16F 15/00*  (2006.01)

(52) U.S. Cl. ................... 267/140.13; 267/292

(58) Field of Classification Search ............ 267/140.13, 267/292, 141, 140.11
See application file for complete search history.

(56) References Cited

U.S. PATENT DOCUMENTS

| | | | |
|---|---|---|---|
| 4,392,639 A * | 7/1983 | Konishi | 267/140.13 |
| 4,842,258 A | 6/1989 | Misaka et al. | |
| 5,775,666 A | 7/1998 | Tsukamoto et al. | |
| 6,357,731 B1 * | 3/2002 | Tanahashi | 267/140.4 |
| 6,622,994 B2 * | 9/2003 | Yamamoto et al. | 267/140.13 |
| 6,669,182 B2 * | 12/2003 | Hibi et al. | 267/140.13 |
| 2004/0119214 A1 * | 6/2004 | Okanaka et al. | 267/140.11 |
| 2004/0173955 A1 * | 9/2004 | Groth et al. | 267/140.13 |
| 2004/0188899 A1 * | 9/2004 | Ichikawa et al. | 267/140.3 |
| 2004/0262830 A1 * | 12/2004 | Maeno et al. | 267/140.4 |
| 2005/0056982 A1 * | 3/2005 | Hasegawa | 267/140.13 |

FOREIGN PATENT DOCUMENTS

| | | | |
|---|---|---|---|
| JP | Y2-3-28194 | | 6/1991 |
| JP | U-7-22144 | | 4/1995 |
| JP | 07190135 A | * | 7/1995 |
| JP | 08-128493 | | 5/1996 |
| JP | 09-066721 | | 3/1997 |
| JP | 2001-322413 | | 11/2001 |
| JP | 2002-081491 | | 3/2002 |

\* cited by examiner

*Primary Examiner*—Robert A. Siconolfi
*Assistant Examiner*—Vu Q Nguyen
(74) *Attorney, Agent, or Firm*—Oliff & Berridge, PLC (57) ABSTRACT

A vibration damping device wherein a stopper rubber disposed between opposing faces of a first mounting member and the retainer member so as to project from one of the opposing faces to the other. When the first and second mounting members undergoes relative displacement axially towards each other, a shock produced at a time when an abutting face of the first mounting member comes into contact with the open end face, i.e., an abutting face of the retainer member absorbed by the stopper rubber coming into contact with the other one of the opposing faces until the first mounting member comes into contact with the open end face of the retainer member. A receiving space is disposed between the opposing faces of the first mounting member and the retainer member so that the stopper rubber is accommodated in an elastically compressive-deformed state within the receiving space when the abutting faces contact together.

12 Claims, 6 Drawing Sheets

VIBRATION DAMPING DEVICE

INCORPORATED BY REFERENCE

The disclosure of Japanese Patent Application No. 2004-338294 filed on Nov. 24, 2004 including the specification, drawings and abstract is incorporated herein by reference in its entirety.

BACKGROUND OF THE INVENTION

1. Field of the Invention

The present invention relates to a vibration damping device disposed between components to be coupled in a vibration damping manner, and more particularly to a vibration damping device suitable for use in an automotive engine mount, body mount, or the like.

2. Description of the Related Art

Vibration damping devices that involve a rubber elastic body disposed between a first mounting member and a second mounting member respectively mounted on components to be coupled in a vibration damping manner enjoy widespread use in a variety of fields. One known type of device, disclosed in JP-A-9-66721 for example, is a device of a structure comprising a rubber elastic body of generally frustoconical shape overall, with the cylindrical section of the second mounting member affixed to the outer peripheral face on the large diameter end thereof, and with the first mounting member affixed to the center section thereof which includes the small diameter section, whereby the first mounting member and the second mounting member are elastically coupled directly by the rubber elastic body.

Vibration damping devices of this kind can advantageously ensure the volume of the rubber elastic body, and can prevent creation of excessive strain, due to deformation of the rubber elastic body being constrained by the second mounting member. This arrangement makes it possible for the devices to advantageously achieve high load bearing performance and endurance, particularly against load input in the direction forcing the small-diameter end face and the large-diameter end face of the rubber elastic body into proximity with one another. Thus, the application of such devices to engine mounts and other arrangements involving heavy initial load is under study.

With vibration damping devices of conventional design comprising such a rubber elastic body of frustoconical shape, when the rubber elastic body is subjected to load in the rebound direction in the opposite direction from the initial load, forcing the small-diameter end face and the large-diameter end face thereof apart from one another, unavoidably the rubber elastic body is subjected directly to tensile stress. Thus, the rubber elastic body is susceptible to cracking or the like due to input load in the rebound direction, posing the risk of appreciably diminished endurance.

Other known vibration damping devices of this kind are sealed fluid type vibration damping devices like those disclosed in JP-A-8-128493 and JP-A-2002-81491, for example, having a non-compressible fluid sealed in a fluid chamber a portion of whose wall is constituted by the rubber elastic body, with vibration damping action derived on the basis of resonance or other such flow action of the non-compressible fluid.

However, in such sealed fluid type vibration damping devices, in addition to the problem discussed previously, there is the further problem that since the fluid sealed in the fluid chamber is the non-compressible, when the rubber elastic body is subjected to a large load in the rebound direction, the sealed fluid exerts constraining force on the rubber elastic body in the direction hindering elastic deformation, so that vibration damping performance is diminished.

Additionally, where the rubber elastic body is subjected to a large load in the rebound direction, a high level of negative pressure occurs within the fluid chamber, and there is a risk that dissolved air present in the sealed fluid will separate and form bubbles, as well as the risk of noise and shock occurring as the bubbles form and disappear. Additionally, there is a risk that due to bubbles forming in this way becoming compressed during input of vibration, pressure changes within the fluid chamber will not be produced effectively, so that the intended vibration damping characteristics are not obtained.

SUMMARY OF THE INVENTION

It is therefore an object of the present invention to provide a vibration damping device of novel construction wherein a rubber elastic body of frustoconical shape, is free from a problem of tensile stress produced in the rubber elastic body due to load input in the rebound direction may be reduced or avoided, affording excellent endurance and load bearing ability, as well as alleviating decline in damping performance.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a vibration damping device comprising: a rubber elastic body having a generally frustoconical shape overall; a retainer member of generally cup shape being bonded by vulcanization to the rubber elastic body so as to open onto a small-diameter end face of the rubber elastic body; a first mounting member disposed separably superposed against the small-diameter end face of the rubber elastic body so that the first mounting member comes into contact with the open end face of the retainer member in an axial direction; a second mounting member bonded to an outer peripheral face of a large-diameter end of the rubber elastic body; a rebound stopper mechanism for restricting in a cushionwise manner an amount of relative displacement of the first mounting member in a direction of separation away from the rubber elastic body being disposed between the first mounting member and the second mounting member; and a stopper rubber disposed in the axial direction between an opposing face of the first mounting member and an opposing face of the retainer member so as to project from one of the opposing faces to an other one of the opposing faces, wherein when the first mounting member is caused to undergo relative displacement in the axial direction from its separated position towards the retaining member, a shock produced at a time when an abutting face of the first mounting member comes into contact with the open end face of the retainer member functioning as an abutting face of the retainer member is absorbed by means of the stopper rubber coming into contact with the other one of the opposing faces until the first mounting member comes into contact with the open end face of the retainer member, and wherein a receiving space is disposed between the opposing faces of the first mounting member and the retainer member so that the stopper rubber is accommodated in an elastically compressive-deformed state within the receiving space when the first mounting member and the open end face of the retainer member come into contact with each other.

In the vibration damping device of construction according to this mode, in the event of load applied in the rebound direction urging the first mounting member and the second mounting member closer together, the first mounting member and the second mounting member are maintained in a substantially elastically coupled state in which they are urged into abutment with each other in the load input direction via the rubber elastic body. Thus, vibration damping action by the rubber elastic body acts effectively against vibration exerted across the first mounting member and the second mounting member.

By means of furnishing the rubber elastic body with a retainer member, compressive deformation of the rubber elastic body may be brought about, while retaining the shape of the small-diameter end of the rubber elastic body. With this arrangement, deformation of the rubber elastic body at the face thereof mating with the first mounting member can be reduced, making it possible to maintain a stable state of abutment with the first mounting member, as well as to bring about deformation of the rubber elastic body with a consistent shape, whereby more consistent vibration damping action may be afforded.

On the other hand, where load is exerted in the rebound direction urging the first mounting member and the second mounting member apart from one another, it is possible to avoid subjecting the rubber elastic body to tensile load, by means of the first mounting member being induced to substantially separate away from the mounting member. Thus, the endurance and load bearing performance (tensile direction) of the rubber elastic body can be improved.

In this mode, by means of constituting a stopper mechanism in the rebound direction, the amount of relative displacement of the first mounting member and the second mounting member can be restricted in cushionwise manner. Therefore, in the event that, for example, load is exerted alternately in the bound direction and rebound direction, axial deviation of the first mounting member and the rubber elastic body (i.e. relative eccentricity of the center axes of the two) in association with marked separating displacement thereof can be reduced, and a stable state of superposition when the first mounting member and the rubber elastic body are in abutment with each other can be achieved.

When the first mounting member transitions from a state separated from the rubber elastic body, and now moves closer to the rubber elastic body and comes into abutment therewith, shock produced when the first mounting member and the retainer member disposed on the rubber elastic body come into abutment is reduced by means of the stopper rubber. Thus, the occurrence of abnormal noise or large shock due to striking one another can be reduced, and the durability of the first mounting member, the retainer member, the rubber elastic body and so on can be improved.

In the vibration damping device pertaining to this mode, the stopper rubber, by means of being accommodated within the receiving space, can produce the effect described previously, with good space efficiency. It is thus possible to effectively ensure rubber volume on the part of the stopper rubber, without the vibration damping device chassis becoming excessively bulky.

A second mode of the invention provides a vibration damping device according to the aforementioned first mode, wherein the abutting face of the first mounting member is constituted as a generally flat face extending in the axis-perpendicular direction, and stopper rubber is disposed with an axial dimension projecting outwardly beyond the open end face from a bottom side of the retainer member, and the receiving space is formed surrounding the stopper rubber within the retainer member.

In the vibration damping device constructed in accordance with this mode, since the receiving space is formed in the interior of the retainer member, a substantially unutilized zone when producing vibration damping action, can be utilized to good advantage to achieve better space efficiency. Further, by constituting the face of the first mounting member which abuts against the retainer member as a generally flat face, a condition of stable abutment against the stopper rubber and the retainer member can be maintained. The stopper rubber in this mode may be constituted as a rubber elastic body separate from the rubber elastic body and affixed to the retainer member, or integrally formed by the rubber elastic body to which the retainer member is affixed. By forming the stopper rubber as a rubber elastic body separate from the rubber elastic body, there is a greater degree of freedom in design of the stopper rubber and the rubber elastic body.

A third mode of the invention provides a vibration damping device according to the aforementioned first mode, wherein the first mounting member includes an open recess formed opening on the abutting face thereof which abuts against the retainer member, with the receiving space being formed by this open recess, and the stopper rubber disposed in the retainer member so as to project into the receiving space.

In the vibration damping device constructed in accordance with this mode, by having the rubber elastic body insert into the open recess formed in the first mounting member, the open recess and the stopper rubber are mated with an appropriate gap. With this arrangement, excessive relative displacement of the first mounting member and the retainer member in the axis-perpendicular direction is restrained by the stopper rubber abutting the inside peripheral face of the open recess, and mutual positioning of the members in the abutting state can be carried out elastically. Thus, axial deviation of the first mounting member and the rubber elastic body can be reduced, and the load exerted on the rubber elastic body by the first mounting member can be stabilized.

A fourth mode of the invention provides a vibration damping device according to any one of the aforementioned first through third modes, wherein the stopper rubber is integrally formed with the rubber elastic body. In the vibration damping device constructed in accordance with this Mode, by obviating the need to manufacture a separate stopper rubber, the number of vulcanization molding steps can be reduced, and manufacture simplified, as well as reducing manufacturing costs.

A fifth mode of the invention provides a vibration damping device according to any one of the aforementioned first through fourth modes, wherein the receiving space is formed within the retainer member, and the stopper rubber is disposed on the abutting face of the first mounting member which abuts against the retainer member, so as to project into the receiving space. In the vibration damping device constructed in accordance with this mode, by disposing the receiving space within the retainer member, it becomes possible to effectively utilize a unutilized zone, to achieve good space efficiency as well as ensuring large rubber volume on the part of the stopper rubber. Also, by having the stopper rubber intrude into the interior of the retainer member and mate with an appropriate gap, excessive relative displacement of the first mounting member and the retainer member in the axis-perpendicular direction can be restrained, and consistent load input to the rubber elastic body achieved.

A sixth mode of the invention provides a vibration damping device according to the aforementioned first through fifth modes, wherein the second mounting member includes an extended portion extending in a rebound direction therefrom, the extended portion provides an abutting portion on a distal end thereof so as to be opposite in the rebound direction to an abutting portion formed on the first mounting member, and a rebound stopper rubber is provided on at least one of the abutting portions to thereby provide the rebound stopper mechanism.

In the vibration damping device according to this mode, the rebound stopper rubber is given a shape having a cylindrical outer peripheral face, such as an annular block shape for example, and the extended portion is given a shape having a cylindrical inner peripheral face matching the shape of the rebound stopper rubber, whereby the stopper rubber can be positioned in axial alignment with the extended portion. With this arrangement, the first and second mounting members, and the rebound stopper rubber may be axially aligned with one another, making it possible to effectively exhibit rebound stopper action, as well as consistently maintaining the direction of input of vibration to be damped, in the axis-perpendicular direction of the second mounting member.

A seventh mode of the present invention provides a vibration damping device according to the aforementioned first through sixth modes, wherein the retainer member is formed of metal by pressing, and includes a flange portion extending diametrically outward at a rim of an opening thereof so that the open end face is formed by the flanged portion, as well as a tapered outer circumferential wall that gradually constricts in diameter going towards a bottom end thereof. In the vibration damping device of construction according to this mode, it is possible by means of the flanged portion to effectively ensure an adequate abutment area with the first mounting member. Additionally, by providing a tapered circumferential wall, load in the bound direction can be consistently directed in the compression direction over a wider range of the rubber elastic body. Additionally, by forming the retainer member as a press fitting having specific construction, the retainer member can be manufactured easily with good cost efficiency.

An eighth mode of the present invention provides a vibration damping device according to any one of the aforementioned first through seventh modes, wherein a cushion rubber layer is disposed between the open end face of the retainer member, and the abutting face of the first mounting member. In the vibration damping device constructed in accordance with this mode, shock occurring when the first mounting member and the retainer member come into abutment can be reduced further.

A ninth mode of the invention is a vibration damping device according to any one of the first through eighth modes, wherein the abutting face of the first mounting member is larger than the abutting face of the retainer member.

In the vibration damping device constructed in accordance with this mode, in the event of relative displacement in the axis-perpendicular between the first mounting member and the retainer member, the retainer member abutting face for mating with the first mounting member can nevertheless be maintained in abutment with the first mounting member, ensuring a stable vibration input to the rubber elastic body. It is accordingly possible to reduce variability of load input to the rubber elastic body due to the fact that the first mounting member is separable from the rubber elastic body, and to obtain consistent vibration damping action.

A tenth mode of the invention provides a vibration damping device according to any one of the aforementioned first through ninth modes, wherein with an initial load exerted across the first mounting member and the second mounting member, and the first mounting member urged into abutment with the retainer member, the stopper rubber is accommodated within the receiving space, in a condition permitting compressive and expansive deformation by being pinched between the opposing faces of the first mounting member and the retainer member.

In the vibration damping device of construction according to this mode, by permitting the stopper rubber to undergo sufficient expansive deformation, cushioning action of the stopper rubber may be effectively obtained. It is preferable that even with the first mounting member and the retainer member urged into abutment, that is, with the stopper rubber in a state of maximum compressive deformation, there remain a predetermined gap between the outside peripheral face of the stopper rubber and the inside peripheral face of the receiving space, so as to prevent the occurrence of abnormal noise due to contact of the stopper rubber with the receiving space. Additionally, it is possible to avoid hindering abutment of the stopper rubber with the first mounting member and the retainer member due to restricted expansive deformation of the stopper rubber, and to carry out effective loading on the rubber elastic body. In this mode, where the members coupled in vibration damped manner are the power unit and body of an automobile, initial load refers to the distributed support load of the power unit.

An eleventh mode of the invention provides a vibration damping device according to the aforementioned first through tenth modes, further comprises a communicating passage whereby, with the first mounting member and the retainer member in an abutting state, the receiving space communicates with an outside. In the vibration damping device constructed in accordance with this mode, it is possible to allow air within the receiving space to escape to the outside, so as to avoid the air within the receiving space acting as an air spring and hindering load input to the rubber elastic body by the first mounting member.

A twelfth mode of the invention provides a vibration damping device according to the aforementioned first through eleventh modes, further comprising a fluid chamber whose wall is partially constituted by the rubber elastic body and having a non-compressible fluid sealed therein, wherein a vibration damping action is produced on a basis of flow action of the non-compressible fluid created in the fluid chamber during vibration input.

In the vibration damping device constructed in accordance with this mode, since the first mounting member is substantially separable with respect to the rubber elastic body, when load is exerted in the rebound direction urging the first mounting member to separate from the rubber elastic body, hindered elastic deformation of the rubber elastic body as a result of the non-compressible fluid acting as a constraining member can be avoided. Thus, it is possible to avoid an increase in the spring constant of the rubber elastic body, and accordingly a decline in vibration damping capability.

Additionally, since negative pressure within the fluid chamber can be reduced, the occurrence of bubbles due to separation of dissolved air present in the noncompressible fluid can be reduced. Thus, abnormal noise and shock occurring as the bubbles form and disappear can be reduced as well, and pressure variations can be induced effectively within the fluid chamber, so that effective vibration damping characteristics can be obtained.

In this mode in particular, by bonding by vulcanization the retainer fitting to the rubber elastic body, it becomes possible to more effectively induce pressure variations within the fluid chamber, and more effective vibration damping characteristics can be obtained.

As will be apparent from the preceding description, in vibration damping devices constructed in accordance with the present invention, during load input in the rebound direction, the first mounting member is urged to substantially separate from the rubber elastic body, reducing or avoiding tensile stress acting on the rubber elastic body, whereby it becomes possible to achieve excellent endurance and load bearing capability, as well as lessening decline in vibration damping characteristics.

Additionally, when the first mounting member and the retainer member come into abutment, shock occurring during abutment is reduced by the stopper rubber formed with excellent space efficiency, thereby reducing the occurrence of abnormal noise or large shock due to striking, as well as making it possible to lessen decline in durability due to the shock of abutment, so that the desired vibration damping characteristics can be achieved over an extended period.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
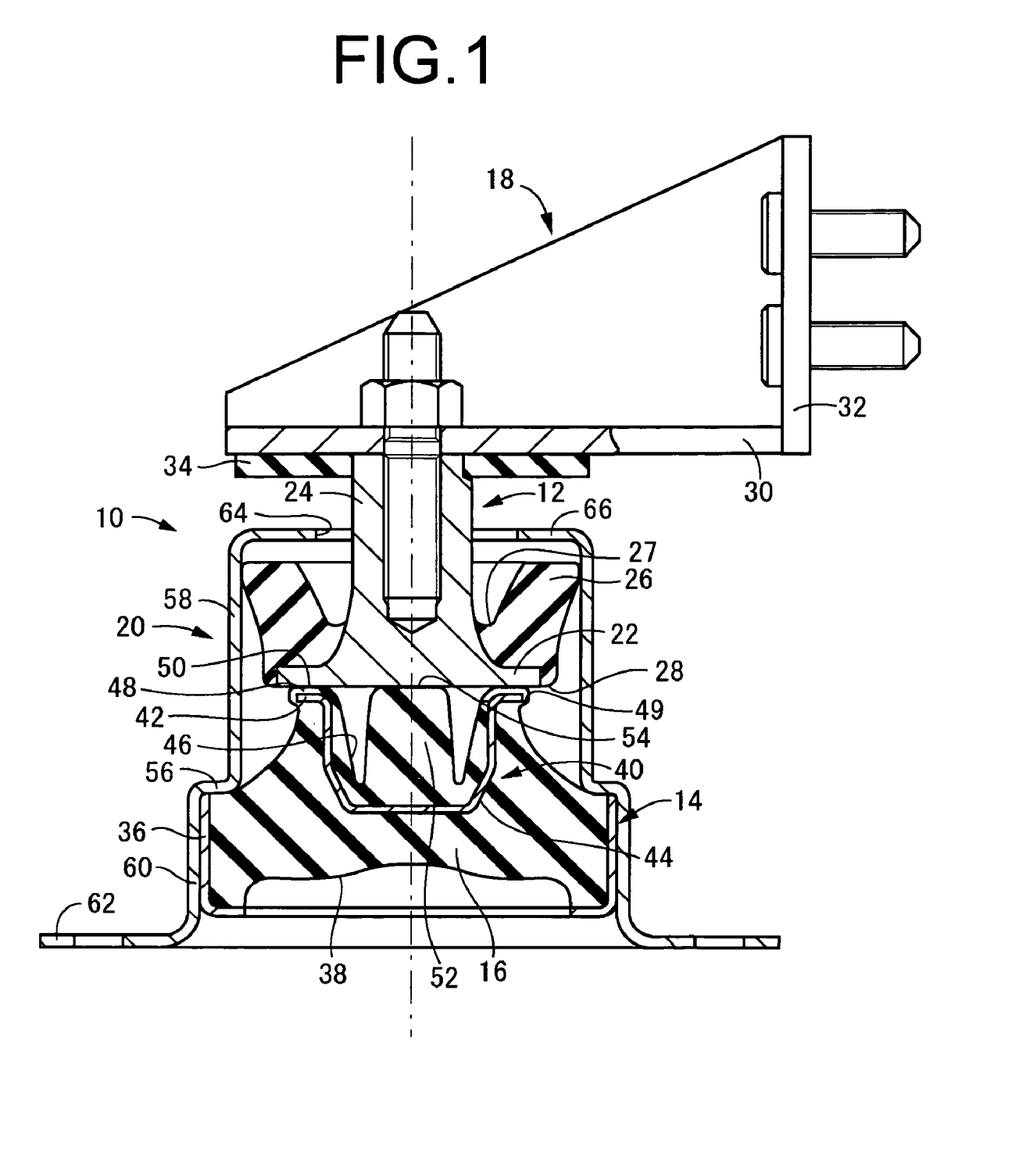
FIG. 1 is an elevational view in axial or vertical cross section of a vibration damping device in the form of an engine mount of construction according to a first embodiment of the invention.

Referring first to FIG. 1, there is shown an automotive engine mount 10 in a first embodiment of the invention. This engine mount 10 has a structure comprising a metallic first mounting member 12 attachable to a power unit (not shown), and a metallic second mounting member 14 attachable to a body (not shown), and a rubber elastic body 16 disposed between them. The first mounting member 12 is attached to the power unit via a bracket 18 on the power unit side, while the second mounting member 14 is to attach the body via a metallic stopper member 20, so that the power unit is supported on the body in vibration damped manner. With the engine mount 10 of this embodiment installed, the distributed support load of the power unit is input in the generally vertical direction in FIG. 1, and effective vibration damping action is produced against vibration in the bound direction generally downward and the rebound direction generally upward in FIG. 1. In the description hereinbelow, as a general rule, the vertical direction refers to the vertical direction in FIG. 1.

More specifically, the first mounting member 12 has a structure in which a rod shaped fastening shaft 24 is integrally formed projecting upward in the axial direction from a disk shaped abutting portion 22. To an outside rim of an upper face of the abutting portion 22, there is bonded by vulcanization a rebound stopper rubber 26 that projects axially upward. This rebound stopper rubber 26 is formed extending all the way around the circumferential direction with a substantially unchanging cross section, and has a thick annular shape overall. In this Embodiment in particular, the rebound stopper rubber 26 has gradually increasing inside diameter dimension and outside diameter dimension going axially upward, and an annular recess 27 formed inside. The rebound stopper rubber 26 is attached so as to cover down to the outside peripheral face of the abutting portion 22. The lower end face of the first mounting member 12 is constituted as a flat abutting face 28 spreading in the axis-perpendicular direction.

The first mounting member 12 having the above construction is attached to the power unit via the power unit-side bracket 18. The power unit-side bracket 18 is fabricated of rigid material such as steel, and has a structure comprising a lateral plate portion 30 for attachment of the first mounting member 12, and a longitudinal plate portion 32 for attachment to the power unit. Between the lateral plate portion 30 and the longitudinal plate portion 32 is disposed a reinforcing rib spanning the distance between the ends in the width direction. With the upper end face of the fastening shaft 24 superposed against the lower face of the lateral plate portion 30, the first mounting member 12 is bolted to the lateral plate portion 30; and the power unit-side bracket 18 with the first mounting member 12 fastened to it in this way is fastened to the power unit by means of bolts implanted in the longitudinal plate portion 32, thereby fastening the first mounting member 12 to the power unit via the power unit-side bracket 18. The lower face of the lateral plate portion 30 is covered by an abutting rubber 34 of sheet form extending out with predetermined thickness around the location where the upper end of the fastening shaft 24 is superposed, constituting a rebound stopper mechanism whereby the level of displacement in the bound direction of the power unit-side bracket 18, and thus the first mounting member 12, with respect to the second mounting member 14 is limited by means of the stopper member 20 striking the lateral plate portion 30 via the abutting rubber 34.

The second mounting member 14 has large-diameter round cylindrical shape. In this embodiment in particular, the structure is produced by a cylindrical portion 36 of round cylindrical shape whose axial bottom edge is bent inwardly into a flange configuration. The first mounting member 12 is disposed at the axial upper end opening side of the cylindrical portion 36 (the upper side in FIG. 1), positioned in opposition thereto on approximately the same center axis. The rubber elastic body 16 is disposed between the first mounting member 12 and the second mounting member 14 positioned in opposition in the axial direction in this way.

Figure 2:
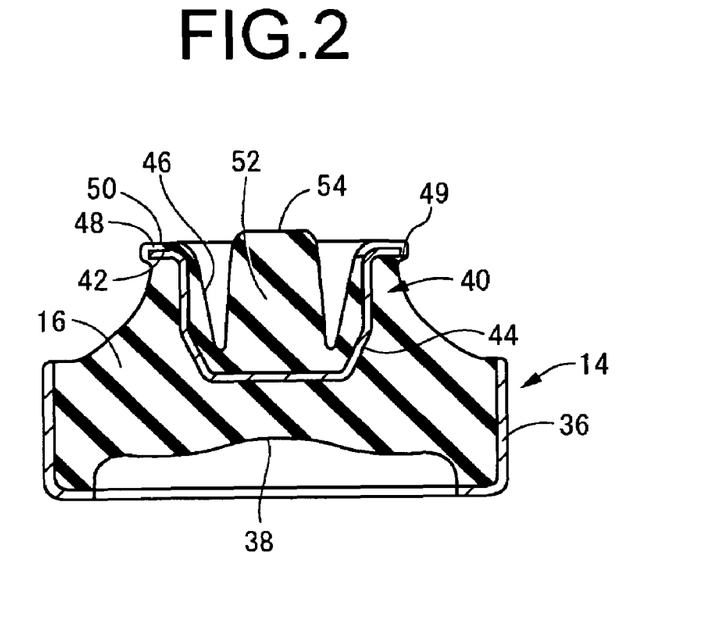
FIG. 2 is a cross sectional view of an integrally vulcanization molded product of the engine mount of FIG. 1.
Figure 3:
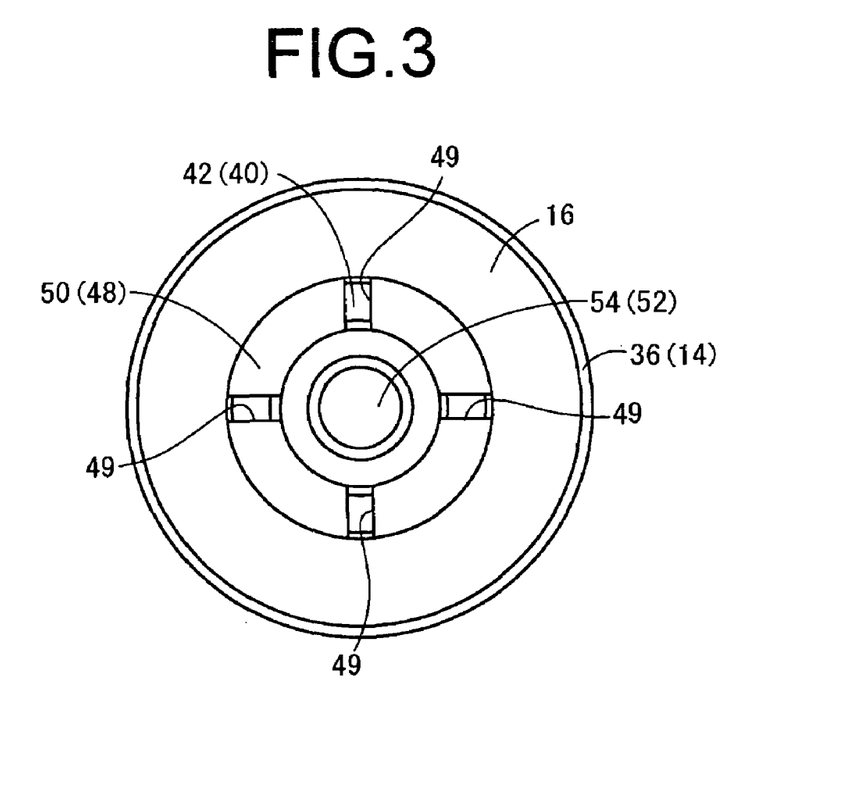
FIG. 3 is a top plane view of the integrally vulcanization molded product of FIG. 2.

As shown in FIG. 2 and FIG. 3 as well, the rubber elastic body 16 has a generally frustoconical shape overall, with an inverted conical recessed face 38 formed opening out onto the large-diameter end face thereof. The second mounting member 14 is vulcanization bonded to the outside peripheral face of the large diameter end of the rubber elastic body 16.

A metallic retainer member 40 is vulcanization bonded to the small-diameter end of the rubber elastic body 16, so as to be superposed onto the small-diameter end face thereof. This retainer member 40 is constituted, for example, by a pressed fitting formed by means of pressing a sheet of metal or other rigid material, and has a rotation-symmetrical, thin-walled generally cup shape of substantially unchanging cross section around the entire circumference. On the rim of the retainer member 40, there is formed a flange portion 42 that extends diametrically outward around the entire circumference. The outside diameter dimension of this flange portion 42 is smaller than the outside diameter dimension of the abutting portion 22 in the first mounting member 12. On the outer peripheral face in proximity to the bottom of the retainer member 40, there is formed around the entire circumference a tapered circumferential wall 44 that gradually decreases in diameter going axially downward. The tapered circumferential wall 44 may be formed on a portion of the outside peripheral face of the retainer member 40 in the axial direction and the circumferential direction, or formed over its entire length. For example, it is not limited to being disposed in proximity to the bottom of the retainer member 40, but may instead be formed in the axial medial portion, or the like. As will be apparent thereby, in this Embodiment, the rubber elastic body 16 is constituted as an integrally vulcanization molded product comprising the second mounting member 14 and the retainer member 40.

With the retainer member 40 positioned at the small-diameter end of the rubber elastic body 16 so as to open upward, the outside peripheral face of the retainer member 40 is vulcanization bonded to the rubber elastic body 16. The rubber elastic body 16 encircles up around the retainer member 40 and forms a rubber layer covering the opening face and inside peripheral face of the retainer member 40. By so doing, there is formed within the interior of the retainer member 40 an opening space 46 which serves as a receiving space that opens towards the abutting face 28 of the first mounting member 12. A cushion rubber layer 48 is formed by the upper edge of the rubber elastic body 16 which has encircled up around the flange portion 42 of the retainer member 40, and a flat abutting face 50 slightly smaller than the abutting face 28 of the first mounting member 12 is formed by the cushion rubber layer 48. In the cushion rubber layer 48, at a suitable number of locations along the circumference of the flange portion 42, there are formed communicating recesses 49 in the form of communicating passages that open upward and extend in the diametrical direction; in this Embodiment in particular, these are formed at four locations at predetermined intervals in the circumferential direction.

A stopper protrusion 52 constituting a stopper rubber that projects along the center axis towards the abutting face 28 of the first mounting member 12 from the approximate center of the opening space 46 is disposed therein, integrally formed with the rubber layer that is affixed to the inside face of the retainer member 40. The stopper protrusion 52 has a frusto-conical shape that gradually decreases in diameter going upward, and a projecting distal end face 54 thereof is formed with a height dimension projecting a predetermined extent beyond the abutting face 50, when not abutted by the first mounting member 12. Between the outside peripheral face of the stopper protrusion 52 and the opening space 46, a predetermined gap is formed around the entire circumference.

The second mounting member 14 of the integrally vulcanization molded product of this construction is mounted to the body via the stopper member 20. The stopper member 20 takes the form, for example, of a thin-walled, large-diameter cylinder formed of metal, having in the axial center portion thereof a shoulder portion 56, to either side of which a small-diameter portion 58 is situated axially above and a large-diameter portion 60 is situated axially below. The bottom edge of the large-diameter portion 60 constitutes a mount plate portion 62 in the form of a flange extending diametrically outward, for mount onto the body. The upper end of the small-diameter portion 58 bends inwardly in the axis-perpendicular direction, whereby the stopper member 20 is endowed with a structure with a stopper plate portion 66 of annular plate shape integrally formed at the upper end of the small-diameter portion 58 and having a center hole 64. In this embodiment, the diameter dimension of the center hole 64 is larger than the outside diameter dimension of the fastening shaft 24 in the first mounting member 12, permitting relative displacement of the first mounting member 12 in the axis-perpendicular direction relative to the stopper member 20.

Into the stopper member 20 of the above design, the first mounting member 12 is inserted from the fastening shaft 24 side into the small-diameter portion 58 from axially below, and then the second mounting member 14, which constitutes part of the rubber elastic body 16 integrally vulcanization molded product, is inserted and secured press-fit into the stopper member 20. By mount the stopper member 20 onto the body by means of bolts disposed on the mount plate portion 62, the first mounting member 12 is mounted onto the power unit via the power unit-side bracket 18, while the second mounting member 14 is mounted onto the body via the stopper member 20. The engine mount 10 is thereby installed between the power unit and the body.

In this embodiment in particular, with the engine mount 10 of FIG. 1 installed on the vehicle, the first mounting member 12 is disposed with the fastening shaft 24 thereof passing through the center hole 64 and projecting up beyond the upper face of the stopper plate portion 66. The first mounting member 12 is positioned resting on the rubber elastic body 16, with the abutting face 28 on the first mounting member 12 side superposed against the abutting face 50 on the rubber elastic body 16 side. Thus, in this embodiment, the upper end of the rebound stopper rubber 26 provided to the first mounting member 12, and especially the upper end outside peripheral face thereof, is in sliding contact with the inside peripheral face of the small-diameter portion 58 around the entire circumference, thereby elastically positioning the first mounting member 12 with respect to the small-diameter portion 58. As a result, in this embodiment, the first mounting member 12 is positioned coaxially with the small-diameter portion 58, and hence with the second mounting member 14. In association therewith, the abutting face 28 of the first mounting member 12 is superposed coaxially against the abutting face 50 on the rubber elastic body 16 side, while the fastening shaft 24 of the first mounting member 12 passes coaxially through the center hole 64. With the first mounting member 12 resting positioned coaxially against the rubber elastic body 16 in this way, the distributed support load of the power unit is exerted on the rubber elastic body 16 in the axial direction of the second mounting member 14.

In this embodiment, by securing the second mounting member 14 press-fit in this manner, the small-diameter portion 58 of the stopper member 20 disposed so as to project out from the second mounting member 14 constitutes the extended portion; the abutting portion 22 of the first mounting member 12 constitutes the abutting portion of the of the first mounting member 12; and the stopper plate portion 66 of the stopper member 20 constitutes the abutting portion on the second mounting member side. The rebound stopper mechanism is constituted to include the abutting portion 22, stopper plate portion 66, small-diameter portion 58, and rebound stopper rubber 26. The rebound stopper rubber 26 need not necessarily be disposed in sliding contact with the inside peripheral face of the small-diameter portion 58 about the entire circumference; it is possible, for example, to vary the spring constant of the small-diameter portion 58 by changing the distance from the inside peripheral face of the small-diameter portion 58 in the circumferential direction.

In the engine mount 10 having the above construction, the first mounting member 12 is formed independently of the rubber elastic body 16, and the first mounting member 12 is positioned superposed against the rubber elastic body 16, whereby there can be assured effective load bearing and vibration damping ability against vibration and the distributed support load of the power unit, input in the direction urging the first mounting member 12 closer to the second mounting member 14.

In this embodiment in particular, since the rubber elastic body 16 is furnished with a retainer member 40, deformation of the abutting face 50 of the rubber elastic body 16 can be controlled, and abutment with the first mounting member 12 can be maintained in a stable manner, enabling stable load input to the rubber elastic body 16.

Further, in this Embodiment, since the abutting face 28 on the first mounting member 12 side is larger than the abutting face 50 on the rubber elastic body 16 side, in the event that relative displacement of the first mounting member 12 and the rubber elastic body 16 in the axis-perpendicular direction should occur, it will nevertheless be possible to maintain the abutting face 28 on the first mounting member 12 side in abutment with the entire abutting face 50 on the rubber elastic body 16 side, whereby it becomes possible to keep the direction of input of vibration and the distributed support load of the power unit generally aligned with the axial direction of the second mounting member 14.

Additionally, in this embodiment, since the rebound stopper rubber 26 is disposed in sliding contact with the small-diameter portion 58, the first mounting member 12 is positioned substantially coaxially with respect to the small-diameter portion 58, and hence the second mounting member 14, whereby it becomes possible to keep the direction of input of vibration and the distributed support load of the power unit generally aligned with the axial direction of the second mounting member 14.

Figure 4:
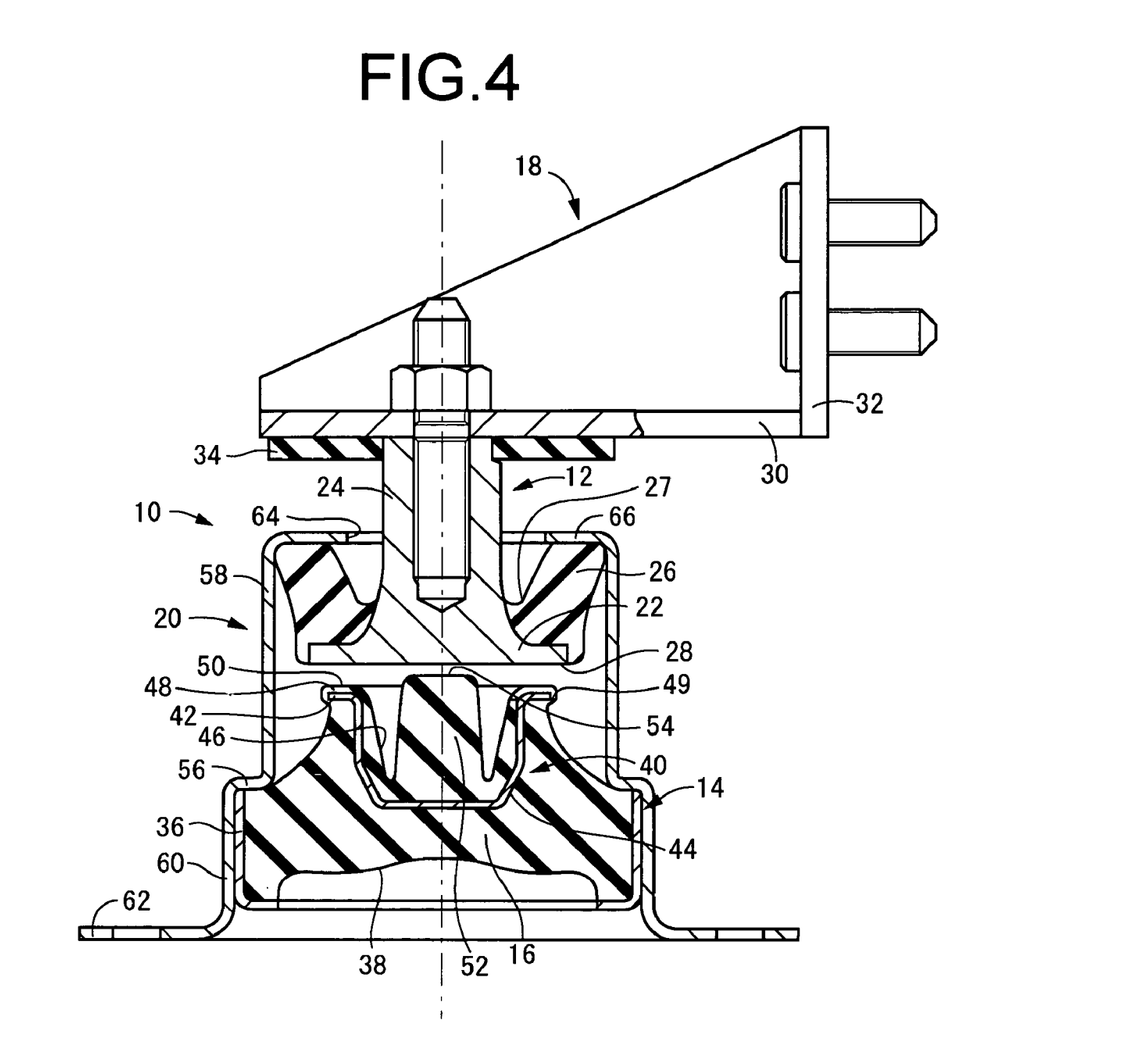
FIG. 4 is a view illustrating a state where the engine mount of FIG. 1 is subjected to an input load in the rebound direction.

On the other hand, as illustrated in FIG. 4, when a large load is input in the rebound direction urging the first mounting member 12 to move away from the second mounting member 14, by means of the first mounting member 12 separating from the rubber elastic body 16, the rubber elastic body 16 can be prevented from being subjected to tensile stress, and thus it is possible to effectively avoid a decline in durability of the rubber elastic body 16.

Here, when the first mounting member 12 separates from the rubber elastic body 16, load input to the stopper protrusion 52 ceases and the projecting distal end face 54 of the stopper protrusion 52 now projects above the abutting face 50. In this state, when the first mounting member 12 is again urged closer towards the rubber elastic body 16, the projecting distal end face 54 of the stopper protrusion first comes into abutment with the abutting face 28 of the first mounting member 12, causing the stopper protrusion 52 to undergo compressive deformation. By means of the cushioning action produced by deformation of the stopper protrusion 52, it is possible to lessen the shock when the first mounting member 12 comes into abutment with the rubber elastic body 16, whereby the occurrence of abnormal noise caused by striking can be reduced, and it becomes possible to improve durability of the first mounting member 12 and the rubber elastic body 16.

Further, in this Embodiment, since a gap is formed about the perimeter of the stopper protrusion 52, permitting the stopper protrusion 52 to undergo expansive deformation to a sufficient extent, it is possible to more effectively realize shock absorbing action of the stopper protrusion 52.

In this embodiment, by means of forming the stopper protrusion 52 within an internal space of the retainer member 40, which represents an unutilized zone that contributes substantially nothing to vibration damping action, it is possible to achieve shock absorbing action as mentioned above, without any increase in height dimension and with good space efficiency.

Additionally, in this embodiment, by providing the rubber elastic body 16 with communicating recesses 49 that provide communication between the opening space 46 and the outside space, it is possible to avoid the air within opening space 46 acting as an air spring, and possibly affecting load input to the rubber elastic body 16 by the first mounting member 12. It is also possible to reduce or eliminate the noise of air leaking to the outside in association with compressive deformation of the stopper protrusion 52 or the cushion rubber layer 48, when the first mounting member 12 comes into abutment with the rubber elastic body 16 (retainer member 40).

While the invention has been shown in terms of a certain embodiment, it is possible to employ any of various specific forms for the receiving space and the stopper rubber. While a number of exemplary preferred structures for the engine mount constructed according to the invention will be described hereinbelow, the invention is not limited to these. Components and areas of structure similar to those in the first Embodiment discussed above will be assigned the same symbols as the first Embodiment in the drawings, and will not be described in any detail.

Figure 5:
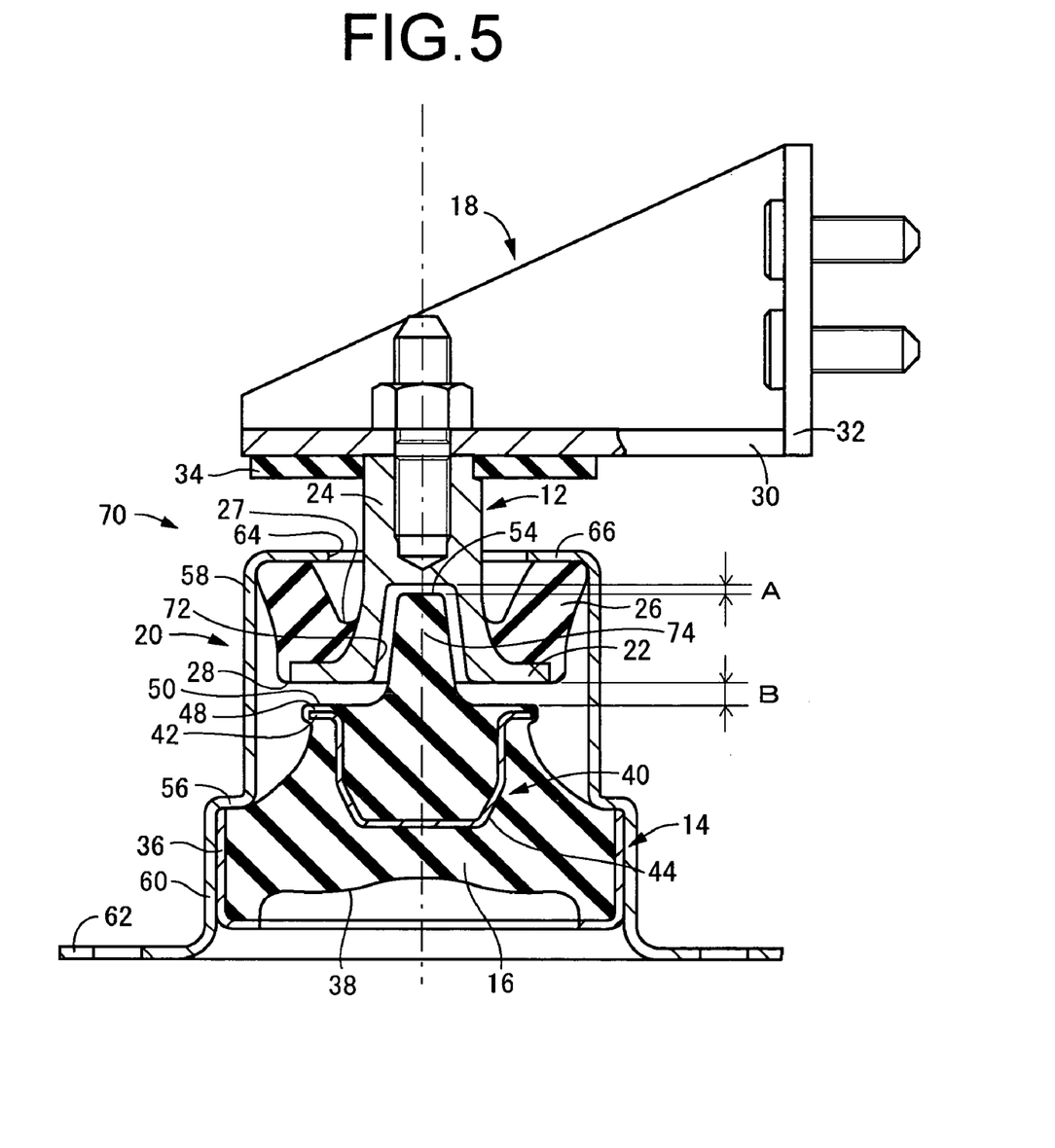
FIG. 5 is an elevational view in axial or vertical cross section of an engine mount of construction according to a second embodiment of the invention.

Referring next to FIG. 5, there is shown an engine mount 70 pertaining to a second Embodiment of the invention. In the engine mount 70 an open recess 72 that opens towards the retainer member 40 is formed in the first mounting member 12, and a stopper protrusion 74 as a stopper rubber is disposed projecting into the open recess 72 from the internal space of the retainer member 40. FIG. 5 depicts load being applied in the rebound direction across the first mounting member 12 and the second mounting member 14, so that the first mounting member 12 and the rubber elastic body 16 are separated.

More specifically, the open recess 72 is formed with a generally frustoconical shape opening onto the abutting face 28 for abutting the retainer member 40, and with the center axis thereof at substantially the same location as the center axis of the first mounting member 12. This open recess 72 has an inside peripheral face shape that widens gradually towards the opening at the bottom.

The stopper protrusion 74, on the other hand, is of frustoconical shape projecting upward with an outside diameter dimension slightly smaller than the inside diameter dimension of the open recess 72 in the first mounting member 12. The projecting height dimension thereof (i.e. the height dimension from the abutting face 50 to the projecting distal end face 54) is larger by a predetermined amount than the height dimension of the open recess 72 (the depth dimension from the abutting face 28 to the upper basal face of the open recess 72). In this embodiment in particular, the rubber elastic body 16 covers the opening of the retainer member 40 and circles into its interior; the stopper protrusion 74 is integrally formed with the rubber elastic body 16. Specifically, the stopper protrusion 74 of this embodiment is composed of a rubber portion filling the interior of the retainer member 40 and a protruding portion protruding axially upward from the retainer member 40, each of these portions being integrally formed with the rubber elastic body 16. However, it is not essential that the rubber elastic body 16 fill the interior space of the retainer member 40 as in this embodiment. It is of course possible instead to form an opening space 46 within the retainer member 40 and to form the stopper protrusion 74 so as to project upward from the bottom of the retainer member 40, as in the first embodiment described previously for example.

In the engine mount 70 constructed in the above manner, when load in the rebound direction is exerted across the first mounting member 12 and the second mounting member 14 causing the first mounting member 12 to separate from the rubber elastic body 16, the axial distance "A" between the opposed faces of the projecting distal end face 54 of the stopper protrusion 74 and the upper basal face of the open recess 72 will be smaller than the axial distance "B" between the opposed faces of the abutting face 50 of the rubber elastic body 16 and the abutting face 28 of the first mounting member 12. With this arrangement, when the first mounting member 12 comes in proximity with the rubber elastic body 16, the projecting distal end face 54 of the stopper protrusion 74 will come into abutment with the upper basal face of the open recess 72 before the abutting faces 28, 50 come into abutment with one another, and the stopper protrusion 74 will undergo compressive deformation within the open recess 72, so that a cushioning action is obtained by means of the stopper protrusion 74. As will be apparent from the description, in this embodiment, the open recess 72 in the first mounting member 12 constitutes a receiving space for receiving the stopper protrusion 74.

Additionally, in this embodiment, since the stopper protrusion 74 is accommodated with a suitable gap within the open recess 72 of the first mounting member 12, in the event that relative displacement of the first mounting member 12 and the rubber elastic body 16 in the axis-perpendicular direction should occur, nevertheless, the inside peripheral face of the open recess 72 will be detained by the stopper protrusion 74, thereby reducing positional shift of the first mounting member 12 and the rubber elastic body 16 in the axis-perpendicular direction, so that a high degree of abutment can be maintained.

Figure 6:
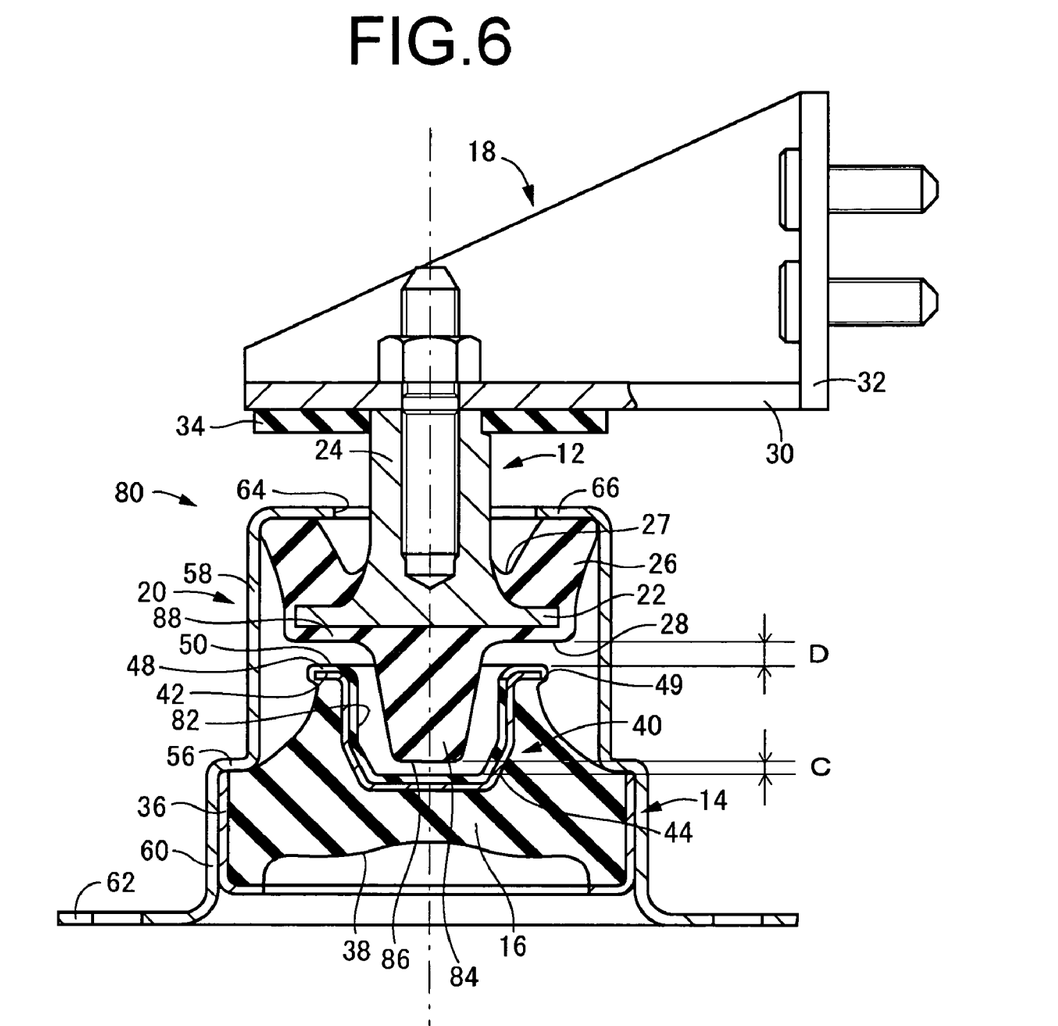
FIG. 6 is an elevational view in axial or vertical cross section of an engine mount of construction according to a third embodiment of the invention.

Referring next to FIG. 6, there is shown an engine mount 80 pertaining to a third embodiment of the invention. In the engine mount 80, an open space 82 is formed as a receiving space within the internal space of the retainer member 40, and a stopper protrusion 84 is formed as a stopper rubber, projecting towards the retainer member 40 from on the abutting face 28 of the first mounting member 12. FIG. 6 depicts load being applied in the rebound direction (the direction urging the first mounting member 12 and the second mounting member 14 to move away from one another on the center axis) across the first mounting member 12 and the second mounting member 14, so that the first mounting member 12 and the rubber elastic body 16 are separated.

More specifically, the open space 82 is formed by the inside face of the retainer member 40, and in this embodiment in particular, the inside face of the retainer member 40 is covered by extending the cushion rubber layer 48 which covers the flange portion 42, with the open space 82 formed by the upper end face of the cushion rubber layer 48.

The stopper protrusion 84, on the other hand, is of frustoconical shape having an outside diameter dimension slightly smaller than the inside diameter dimension of the open space 82 in the rubber elastic body 16, and projecting downward from the abutting face 28 on the first mounting member 12 side; the center axis thereof is situated at generally the same location as the center axis of the first mounting member 12, and projecting height dimension thereof (i.e. the height dimension from the projecting distal end face 86 to the abutting face 28) is larger by a predetermined amount than the height dimension of the open space 82 (the height dimension from the basal face of the open space 82 to the abutting face 50). In this Embodiment in particular, the stopper protrusion 84 is integrally formed with the rebound stopper rubber 26, by downward projection of part of the rebound stopper rubber 26 to enclose the abutting portion 22 of the first mounting member 12. By means of enclosing the bottom of the abutting portion 22, the rebound stopper rubber 26 forms a cushion rubber layer 88 which covers the bottom face of the abutting portion 22, with the abutting face 28 on the first mounting member 12 side being formed by the lower end face of the cushion rubber layer 88.

In the engine mount 80 of this construction as well, when load in the rebound direction is exerted across the first mounting member 12 and the second mounting member 14 causing the first mounting member 12 to separate from the rubber elastic body 16, the axial distance "C" between the opposed faces of the projecting distal end face 86 of the stopper protrusion 84 and the basal face of the open space 82 will be smaller than the axial distance "D" between the opposed faces of the abutting face 50 of the rubber elastic body 16 and the abutting face 28 of the first mounting member 12. By so doing, when the first mounting member 12 comes in proximity with the rubber elastic body 16, the projecting distal end face 86 of the stopper protrusion 84 will come into abutment with the basal face of the open space 82 before the abutting faces 28, 50 come into abutment with one another, and the stopper protrusion 84 will undergo compressive deformation within the open space 82, so that a cushioning action is obtained by means of the stopper protrusion 84. In this embodiment in particular, since a cushion rubber layer 88 is formed on the abutting face 28 on the first mounting member 12 side as well, it is possible to more effectively reduce shock when the first mounting member 12 and the rubber elastic body 16 come into abutment.

In this embodiment as well, excessively large relative displacement of the first mounting member 12 and the rubber elastic body 16 in the axis-perpendicular direction can be controlled by means of the stopper protrusion 84 being detained by the inner peripheral face of the open space 82. Additionally, by utilizing the internal space of the retainer member 40 as the receiving space, large rubber volume of the stopper protrusion 84 can be assured, and more effective cushioning action can be obtained.

Figure 7:
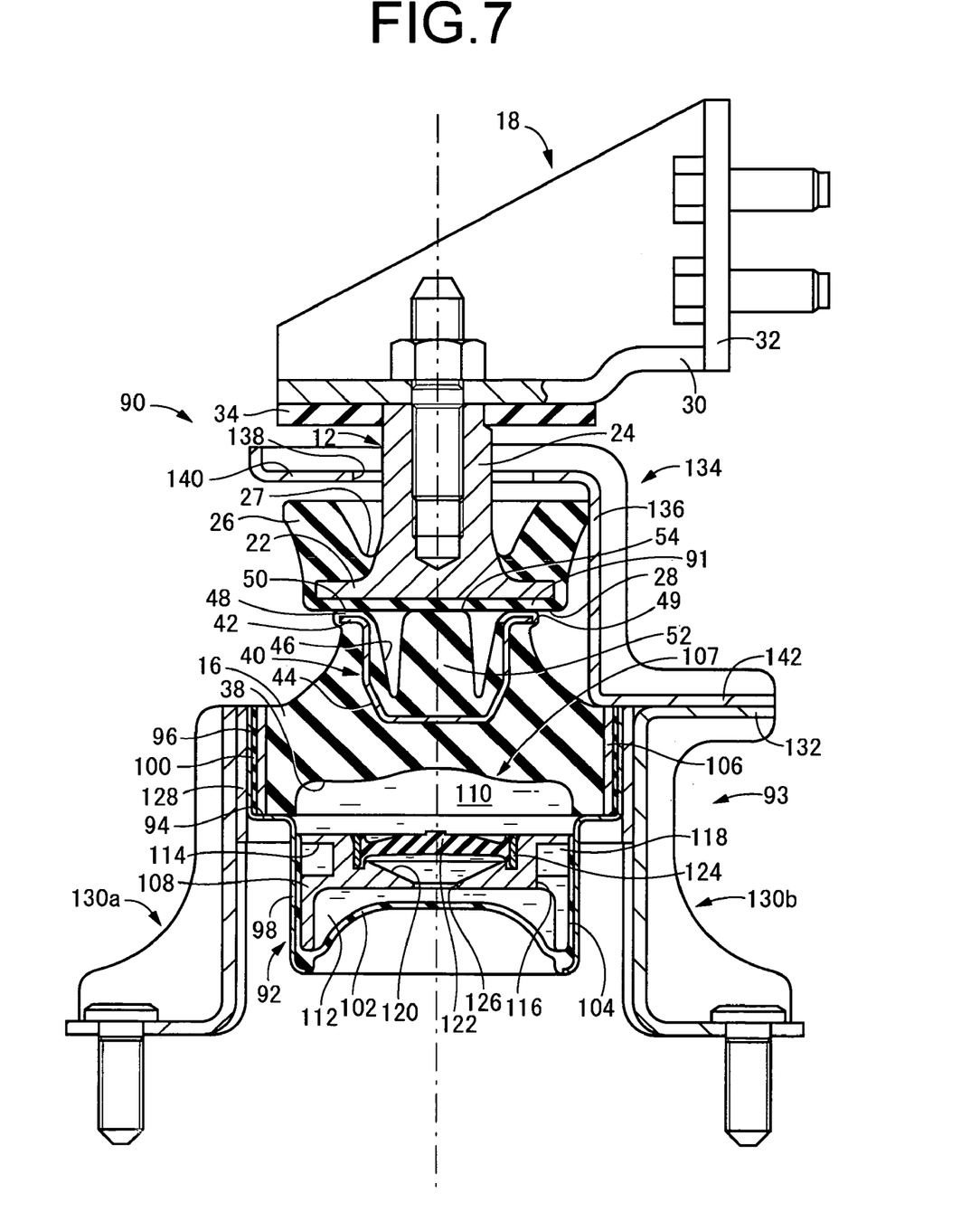
FIG. 7 is an elevational view in axial or vertical cross section of an engine mount of construction according to a fourth embodiment of the invention.

Referring next to FIG. 7, there is shown an engine mount 90 pertaining to a fourth Embodiment of the invention. The engine mount 90 is constituted as a sealed fluid type vibration damping device comprising a fluid chamber a portion of whose wall is constituted by the recessed face 38 of the rubber elastic body 16; by mount the first mounting member 12 onto the power unit via the power unit-side bracket 18 and mount the second mounting member 92 onto the body via the body-side bracket 93, the power unit is supported on the body in vibration damped manner.

More specifically, the first mounting member 12 has a structure generally similar to the engine mount 10 of the first Embodiment described previously; and in this Embodiment in particular, the rebound stopper rubber 26 is extended to the lower end face of the abutting portion 22, whereby the entire lower face of the abutting portion 22 is covered by the rebound stopper rubber 26. With this arrangement, a cushion rubber layer 91 composed of the rebound stopper rubber 26 is formed below the first mounting member 12, with the lower end face of the cushion rubber layer constituting the abutting face 28.

The second mounting member 92, on the other hand, has a large-diameter cylindrical shape overall, having a shoulder portion 94 formed in the axial center portion thereof, to either side of which a large-diameter portion 96 is situated axially above and a small-diameter portion 98 is situated axially below. A thin seal rubber layer 100 adheres to the inside peripheral face of the large-diameter portion 96, and a diaphragm 102 composed of a rubber film of thin disk shape is disposed on the opening on the small-diameter portion 98 end, with the outer peripheral edge of the diaphragm 102 vulcanization bonded to the inside peripheral face of the small-diameter portion 98, whereby the opening on the small-diameter portion 98 end is provided with fluidtight closure by the diaphragm 102. A seal rubber 104 integrally formed with the diaphragm 102 adheres to the inside peripheral face of the small-diameter portion 98, over the entirety thereof.

The first mounting member 12 is disposed spaced apart from the opening end of the large-diameter portion 96 in the second mounting member 92, with the rubber elastic body 16 disposed between the first mounting member 12 and the second mounting member 92.

The rubber elastic body 16 is of construction generally similar to that in the engine mount 10 of the first Embodiment, being of generally frustoconical shape comprising a retainer member 40 and a stopper protrusion 52, and having a coupling fitting 106 of cylindrical shape vulcanization bonded to the outside peripheral face of the large-diameter end thereof.

The coupling fitting 106 is inserted into the large-diameter portion 96 of the second mounting member 92, and the large-diameter portion 96 is reduced in diameter through drawing or the like, to fasten the coupling fitting 106 to the second mounting member 92. With this arrangement, the opening on the large-diameter portion 96 end of the second mounting member 92 is covered fluidtightly by the rubber elastic body 16, thereby forming to the inside of the second mounting member 92 a fluid chamber 107 constituting a fluid chamber isolated fluidtightly from the outside space, between the opposing face of the rubber elastic body 16 and the diaphragm 102, in which fluid chamber 107 is sealed a noncompressible fluid.

As the noncompressible fluid it is possible for example to employ water, an alkylene glycol, a polyalkylene glycol, silicone oil or the like; in order to effectively obtain vibration damping through fluid resonance action, it is preferable to employ a low viscosity fluid with viscosity of 0.1 Pa·S or lower.

A partition member 108 is positioned accommodated within the small-diameter portion 98 of the second mounting member 92. This partition member 108 is of round block shape overall, and is fastening fitting fluidtightly against the inside peripheral face of the small-diameter portion 98. Fastening of the partition member 108 can be realized advantageously through drawing etc. of the small-diameter portion 98.

By positioning the partition member 108 in this way, the hermetic zone formed to the inside of the second mounting member 92 is partitioned to either side in the axial direction (the rubber elastic body 16 side and the diaphragm 102 side). By so doing, on the side axially above the partition member 108, there is formed a pressure receiving chamber 110 a portion of whose wall is constituted by the rubber elastic body 16, and that undergoes change in internal pressure on the basis of elastic deformation of the rubber elastic body 16 during vibration input. Axially below the partition member 108, on the other hand, there is formed an equilibrium chamber 112 a portion of whose wall is constituted by the diaphragm 102, that readily undergoes change in volume based on deformation of the diaphragm 102.

A circumferential groove 114 that opens onto the outside peripheral face and extends in the circumferential direction is formed in the partition member 108, and by covering the outside peripheral opening of the circumferential groove 114 with the small-diameter portion of the second mounting member 92, there is formed an orifice passage 118 that extends a predetermined distance in the circumferential direction, with a first circumferential end thereof in communication with the pressure receiving chamber 110 via a communication hole (not shown) and with the other circumferential end thereof in communication with the equilibrium chamber 112 via a communication hole 116, thereby allowing fluid flow between the pressure receiving chamber 110 and the equilibrium chamber 112. In this embodiment, the passage length, cross sectional area etc. of the orifice passage 118 have been established such that effective vibration damping is exhibited against shake, idling vibration, and other such low-frequency vibration, on the basis of resonance action of the fluid flowing through the orifice passage 118.

A center recess 120 that opens onto the upper face is formed in the partition member 108, and a rubber elastic plate 122 is fitted into this center recess 120. This rubber elastic plate 122 is generally disk shaped of predetermined thickness, and has a fitment ring 124 vulcanization bonded to its outside peripheral face. The fitment ring 124 is press-fit into the center recess 120 and secured fitting therein, whereby the rubber elastic plate 122 is disposed so as to extend in the axis-perpendicular direction within the center recess 120. In this Embodiment, the basal portion of the center recess 120 has a tapered face that gradually constricts in diameter going axially downward, whereby with the rubber elastic plate 122 positioned within the center recess 120, the lower face of the rubber elastic plate 122 is situated above and spaced apart from the basal face of the center recess 120, as a result of which elastic deformation and elastic displacement of the rubber elastic plate 122 is permitted.

A through-hole 126 is formed in the basal portion of the center recess 120, whereby the internal pressure of the equilibrium chamber 112 and the internal pressure of the pressure receiving chamber 110 are exerted respectively upon the lower face and the upper face of the rubber elastic plate 122. In association with elastic deformation of the rubber elastic plate 122 based on a pressure difference between the two chambers 110, 112, there is produced substantial fluid flow between the pressure receiving chamber 110 and the equilibrium chamber 112 of a fluid amount equivalent to the level of elastic deformation of the rubber elastic plate 122. In this embodiment in particular, tuning is performed such that, under conditions in which fluid flow resistance through the orifice passage 118 has become markedly elevated during input of high frequency vibration such as rumble, substantial fluid flow between the pressure receiving chamber 110 and the equilibrium chamber 112 will be permitted on the basis of elastic deformation and elastic displacement of the rubber elastic plate 122, whereby the pressure increase in the pressure receiving chamber 110 can be reduced or eliminated to avoid markedly high dynamic spring, and maintain good vibration damping action.

The second mounting member 92 with the rubber elastic body 16 etc. fixedly attached thereto is mounted on the body via a body-side bracket 93. The body-side bracket 93 has a structure in which several (three in this Embodiment) leg portions 130a, 130b, 130b are affixed by means of welding or the like to a tubular portion 128 that extends in the axial direction with a circular cross section. Of the leg portions 130a, 130b, 130b, the pair 130b, 130b are situated in opposition in the diametrical direction, with a support plate portion 132 formed extending diametrically outward at the upper edges thereof, and affixed to the tubular portion 128 such that the support plate portion 132 and the upper edge of the tubular portion 128 are coplanar.

A stopper member 134 is mounted on the body-side bracket 93. The stopper member 134 is of generally jib shape fabricated of steel or other rigid material, for example; on the axial upper end of a tubular portion 136 that extends in the axial direction there is formed a top panel portion 140 having a center hole 138 and flat in the axis-perpendicular direction; while at the axial lower end are formed a pair of mount plates 142, 142 that extend diametrically outward. The mount plates 142, 142 are superposed against the support plate portion 132 formed on the leg portions 130b, 130b, and affixed thereto by means of welding or the like, to fixedly mount the stopper member onto the body-side bracket 93.

By then press-fitting the large-diameter portion 96 of the second mounting member 92 into the tubular portion 128 on the body-side bracket 93, the second mounting member 92 is fastened to the body-side bracket 93. By so doing, the tubular portion 136 of the stopper member 134 is constituted as an extended portion extending in the rebound direction from the second mounting member 92, and an abutting portion is formed by the lower end face of the top panel portion 140, whereby a rebound stopper mechanism for controlling excessive displacement of the first mounting member 12 in the rebound direction is constituted to include the tubular portion 136, the top panel portion 140, and the abutting portion 22 and rebound stopper rubber 26 of the first mounting member 12.

Then, by fastening the leg portions 130a, 130b, 130b making up the body-side bracket 93 to the body, the second mounting member 92 is mounted onto the body via the body-side bracket 93.

In the engine mount 90 of the structure described above, since the first mounting member 12 is separable from the rubber elastic body 16, in the event of input of a large load in the rebound direction, tensile deformation of the rubber elastic body 16 upwardly in the axial direction is avoided, and the noncompressible fluid sealed within the pressure receiving chamber 110 acting as a constraining member to inhibit tensile deformation of the rubber elastic body 16 can be avoided.

By avoiding or reducing tensile deformation of the rubber elastic body 16, negative pressure created within the pressure receiving chamber 110 can be reduced, and the formation of air bubbles can be reduced. It is possible thereby to reduce abnormal noise and shock due to the formation and disappearance of air bubbles, and pressure variations can be induced effectively within the pressure receiving chamber 110, so that effective vibration damping characteristics can be obtained. In this Embodiment in particular, by disposing the retainer member 40 in the rubber elastic body 16, it becomes possible to more effectively produce pressure variations within the pressure receiving chamber 110.

Meanwhile, when load is input in the bound direction urging the first mounting member 12 in proximity to the rubber elastic body 16, it is possible by means of the cushioning action of the stopper protrusion 52 to reduce impact when the two members 12, 16 come into abutment, and to reduce strike noise, as well as to improve durability. In this embodiment in particular, since a cushion rubber layer 91 is formed on the abutting face 28 on the first mounting member 12 side as well, it is possible to effectively reduce shock when the first mounting member 12 and the rubber elastic body 16 come into abutment.

While certain preferred Embodiments of the invention have been described in detail herein, these are merely exemplary and the invention should not be construed as being limited in any way to the specific disclosure in the embodiments.

For example, whereas in the Embodiments discussed previously, the stopper rubber is integrally formed with the rubber elastic body 16 and rubber elastic body 16 making up the rebound stopper mechanism, it would of course be possible to constitute is as a separate element instead. This can assure a large degree of freedom in tuning elastic characteristics, durability, and other characteristics, since different rubber materials can be used for the stopper rubber than for the rubber elastic body 16 or rebound stopper rubber 26. Nor is the shape of the stopper rubber is not limited to the frustoconical shape described previously, it being possible to employ instead a circular rod shape, square rod shape, or various other shapes, as appropriate. Additionally, stopper rubbers may be disposed on both the rubber elastic body 16 side and the first mounting member 12 side.

With regard to the rebound stopper rubber 26 as well, it is possible to form the member with any of a variety of shapes, or to dispose it on the second mounting member 14 side. Further, the rebound stopper mechanism using the rebound stopper rubber 26 may be constituted indirectly via a body-side bracket or the like, between the first mounting member 12 and the second mounting member 14 as described previously; or disposed directly between the first mounting member 12 and the second mounting member 14, by extending the second mounting member 14 per se, for example.

Additionally, it is possible to adopt any of a variety of shapes as the specific shape for the retainer member 40, and it is not always necessary to provide a flange portion or tapered inside peripheral face as described previously. For example, by producing a thicker retainer member by means of die casting or the like, an effect similar to a flange can be obtained even in the absence of a flange portion.

Nor is it always necessary for a cushion rubber to be disposed between the abutting faces of the first mounting member 12 and the retainer member 40. In the first Embodiment described previously, communicating recesses 49 were formed in the cushion rubber layer 48, as communicating passages for the receiving space interior to communicate with the outside space; however, it is possible to adopt any of a variety of specific constructions for the communicating passages, for example, forming a through-hole passing through the first mounting member 12 and the rebound stopper rubber 26 to enable the opening space 46 to communicate with the outside space.

Additionally, the invention may be applied analogously to automotive body mounts or member mounts, or to mounts, dampers, or other vibration damping devices in non-automotive devices of various kinds.

It is also to be understood that the present invention may be embodied with various other changes, modifications and improvements, which may occur to those skilled in the art, without departing from the spirit and scope of the invention defined in the following claims.

What is claimed is:

1. A vibration damping device comprising:
  a rubber elastic body having a generally frustoconical shape overall;
  a retainer member of generally cup shape being bonded by vulcanization to the rubber elastic body so as to open onto a small-diameter end face of the rubber elastic body;
  a first mounting member disposed separably superposed against the small-diameter end face of the rubber elastic body so that the first mounting member comes into contact with an open end face of the retainer member in an axial direction;

a second mounting member bonded to an outer peripheral face of a large-diameter end of the rubber elastic body;

a rebound stopper mechanism for restricting in a cushion-wise manner an amount of relative displacement of the first mounting member in a direction of separation away from the rubber elastic body being disposed between the first mounting member and the second mounting member; and a stopper rubber disposed in the axial direction between an opposing face of the first mounting member and an opposing face of the retainer member so as to project from one of the opposing faces to an other one of the opposing faces, wherein when the first mounting member is caused to undergo relative displacement in the axial direction from a separated position towards the retainer member, the stopper rubber comes into contact with the other one of the opposing faces of the first mounting member and the retainer member until the first mounting member comes into contact with the open end face of the retainer member so that a shock produced at a time when an abutting face of the first mounting member comes into contact with the open end face of the retainer member functioning as an abutting face of the retainer member is absorbed; and wherein a receiving space is disposed between the opposing faces of the first mounting member and the retainer member so that the stopper rubber is accommodated in an elastically compressive-deformed state within the receiving space when the first mounting member and the open end face of the retainer member come into contact with each other.

2. A vibration damping device according to claim 1, wherein the abutting face of the first mounting member is constituted as a generally flat face extending in an axis-perpendicular direction, and the stopper rubber is disposed with an axial dimension projecting outwardly beyond the open end face from a bottom side of the retainer member, and the receiving space is formed surrounding the stopper rubber within the retainer member.

3. A vibration damping device according to claim 1, wherein the first mounting member includes an open recess formed opening on the abutting face thereof which abuts against the retainer member, with the receiving space being formed by this open recess, and the stopper rubber disposed in the retainer member so as to project into the receiving space.

4. A vibration damping device according to claim 1, wherein the stopper rubber is integrally formed with the rubber elastic body.

5. A vibration damping device according to claim 1, wherein the receiving space is formed within the retainer member, and the stopper rubber is disposed on the abutting face of the first mounting member which abuts against the retainer member, so as to project into the receiving space.

6. A vibration damping device according to claim 1, wherein the second mounting member includes an extended portion extending in a rebound direction therefrom, the extended portion provides an abutting portion on a distal end thereof so as to be opposite in the rebound direction to an abutting portion formed on the first mounting member, and a rebound stopper rubber is provided on at least one of the abutting portions to thereby provide the rebound stopper mechanism.

7. A vibration damping device according to claim 1, wherein the retainer member is formed of metal by pressing, and includes a flange portion extending diametrically outward at a rim of an opening thereof so that the open end face is formed by the flange portion, as well as a tapered outer circumferential wall that gradually constricts in diameter going towards a bottom end thereof.

8. A vibration damping device according to claim 1, wherein a cushion rubber layer is disposed between the open end face of the retainer member, and the abutting face of the first mounting member.

9. A vibration damping device according to claim 1, wherein the abutting face of the first mounting member is larger than the abutting face of the retainer member.

10. A vibration damping device according to claim 1, wherein with an initial load exerted across the first mounting member and the second mounting member, and the first mounting member urged into abutment with the retainer member, the stopper rubber is accommodated within the receiving space, in a condition permitting compressive and expansive deformation by being pinched between the opposing faces of the first mounting member and the retainer member.

11. A vibration damping device according to claim 1, further comprising a communicating passage whereby, with the first mounting member and the retainer member in an abutting state, the receiving space communicates with an outside.

12. A vibration damping device according to claim 1, further comprising a fluid chamber whose wall is partially constituted by the rubber elastic body and having a non-compressible fluid sealed therein, wherein a vibration damping action is produced on a basis of flow action of the non-compressible fluid created in the fluid chamber during vibration input.

* * * * *